(12) United States Patent
Anklam et al.

(10) Patent No.: US 8,514,228 B2
(45) Date of Patent: Aug. 20, 2013

(54) METHOD FOR THE VISUAL DISPLAY OF THE QUALITY OF POWER TRANSMITTED ON A POWER TRANSMISSION SYSTEM

(75) Inventors: Uwe Anklam, Kammerstein (DE); Werner Höfler, Eckental (DE); Markus Kraft, Ühlfeld (DE); Bernd Mitter, Möhrendorf (DE); Jan Pralle, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 498 days.

(21) Appl. No.: 12/922,197

(22) PCT Filed: Mar. 11, 2008

(86) PCT No.: PCT/EP2008/002023
§ 371 (c)(1),
(2), (4) Date: Oct. 4, 2010

(87) PCT Pub. No.: WO2009/112055
PCT Pub. Date: Sep. 17, 2009

(65) Prior Publication Data
US 2011/0164039 A1    Jul. 7, 2011

(51) Int. Cl.
*G06T 11/20* (2006.01)
(52) U.S. Cl.
USPC .......................................................... 345/440
(58) Field of Classification Search
USPC .......................................................... 345/440
See application file for complete search history.

(56) References Cited

U.S. PATENT DOCUMENTS

2005/0038825 A1    2/2005    Tarabzouni et al.
2007/0083398 A1    4/2007    Ivey et al.

*Primary Examiner* — Ryan R Yang
(74) *Attorney, Agent, or Firm* — Laurence A. Greenberg; Werner H. Stemer; Ralph E. Locher

(57) ABSTRACT

In a visual display of power transmission quality, at least three display regions are displayed. The display regions are a time-related, a location-related and a control-related display region. The time-related display region enables a selection of the time interval on the part of the user that is to be examined for a violation of one or more predetermined power quality rules.

14 Claims, 7 Drawing Sheets

METHOD FOR THE VISUAL DISPLAY OF THE QUALITY OF POWER TRANSMITTED ON A POWER TRANSMISSION SYSTEM

BACKGROUND OF THE INVENTION

Field of the Invention

The invention relates to a method for visual display of the quality of power transmitted in a power transmission installation. For the purposes of this patent application, power transmission installations mean any installations which can transmit power, that is to say for example electrical power transmission installations which transmit power in electrical form, or media-based power transmission installations, such as gas line systems, natural gas line systems or oil line systems, which transmit energy on a media basis, irrespective of whether this is gas- or oil-based.

BRIEF SUMMARY OF THE INVENTION

In this context, the invention is based on the object of specifying a method which makes it possible for a user to obtain a particularly large amount of information with particularly little control effort.

According to the invention, this object is achieved by a method having the features as claimed in patent claim 1. Advantageous refinements of the invention are specified in dependent claims.

The invention accordingly provides for at least three display areas to be displayed, specifically a time-related display area, a position-related display area and a rule-related display area, wherein the time-related display area allows user selection of the time interval which is intended to be investigated for rule infringement of one or more predetermined power quality rules, wherein the position-related display area displays one or more predetermined installation sections which are investigated for a rule infringement, and wherein the rule-related display area displays one or more predetermined power quality rules for which the rule infringement investigation is being carried out, and wherein, after user selection of the time interval, the installation sections in which a rule infringement has occurred in the selected time interval, and which power quality rules have been infringed, are determined, and the respective installation sections and power quality rules affected by a rule infringement are visually marked in the position-related display area and the rule-related display area.

One major advantage of the method according to the invention is that the information is displayed correlated on a section and rule basis, for example such that information about installation sections and quality rules can be obtained simply by varying the time reference, without additionally and specifically also having to check for this information on a section and rule basis. For example, this makes it possible to visualize propagation of a rule infringement from one installation section to the next, or to correlate rule infringements between the power quality rules, simply by selecting time intervals or by making changes on the time axis.

According to one preferred refinement of the method, after displaying the installation sections in which a rule infringement has occurred in the selected time interval, and which power quality rules have been infringed, a user selection is made possible by means of which one or more of the power quality rules affected by a rule infringement can be selected, wherein, after a user selection, the installation sections affected by a rule infringement with respect to the selected power quality rules are determined. In this refinement of the method, the user can himself select the power quality rules, or can select the number of power quality rules, in order to define the extent to which the individual information items relating to the individual installation sections will be compressed before being displayed.

According to another advantageous refinement of the method, it is possible that, after displaying the installation sections in which a rule infringement has occurred in the selected time interval, and which power quality rules have been infringed, a user selection is made possible by means of which one or more of the installation sections affected by a rule infringement can be selected, wherein, after a user selection, the power quality rules which have been affected by a rule infringement with respect to the selected installation sections are determined. In this refinement of the method, the user can himself select the installation sections or can select the number of installation sections in order to define the extent to which the individual information items should be compressed before being displayed.

It is also possible that, after displaying the installation sections in which a rule infringement has occurred in the selected time interval, and which power quality rules have been infringed, a user selection is made possible by means of which one or more of the installation sections affected by a rule infringement and one or more of the power quality rules affected by a rule infringement can be selected, wherein, after a user selection, the selected power quality rules which have been affected by a rule infringement with respect to the selected installation sections are determined.

In addition, it is considered advantageous if the time profile of a power quality value which represents a measure of the power quality at the respective time within the time interval is displayed in the time-related display area for the respective user-selected time interval. Displaying a time profile of a power quality value allows an operator to evaluate the relationships particularly quickly.

Preferably, all predetermined installation sections and all predetermined power quality rules are taken into account for determining the power quality value. Alternatively, only those installation sections and power quality rules which are affected by a rule infringement within the user-selected time interval are taken into account for determining the power quality value. Particularly preferably, all the installation sections and all the selected power quality rules are taken into account for determining the power quality value when no rule infringement is found within the time interval.

Furthermore, it is considered to be advantageous if, when a user selection is made of one or more power quality rules for determining and displaying the power quality value in the time-related display area, only those selected power quality rules and those installation sections are taken into account which have been affected by a rule infringement within the time interval and with respect to the selected power quality rules.

Accordingly, it is likewise considered to be advantageous if, in the event of a user selection of one or more installation sections for determining and displaying the power quality value in the time-related display area, only the selected installation sections and those power quality rules are taken into account which have been affected by a rule infringement within the time interval and within the selected installation sections.

The optical marking of installation sections and/or power quality rules is preferably carried out in traffic-light form, by means of red or green traffic-light symbols.

The invention also relates to a display device having a screen for visual display of the quality of power transmitted in a power transmission installation, having a control device which is connected to the screen, and having an input device which is connected to the control device and allows a user input of a time interval and a user selection of one or more power quality rules and/or a user selection of one or more installation sections. According to the invention, the control device is suitable for carrying out one of the methods described above. By way of example, the control device may be formed by a data processing installation.

Preferably, the control device is connected to a memory in which the time profile of the rule-specific and section-specific power quality value is in each case stored for each predetermined power quality rule and for each installation section.

A computer program product which, after installation on a data processing installation, programs the data processing installation such that it can carry out one of the methods described above, is also considered to be part of the invention.

The invention will be explained in more detail in the following text with reference to exemplary embodiments and in this case, by way of example:

DESCRIPTION OF THE INVENTION

For the sake of clarity, the same reference signs are always used for identical or comparable components in the figures.

Figure 1:
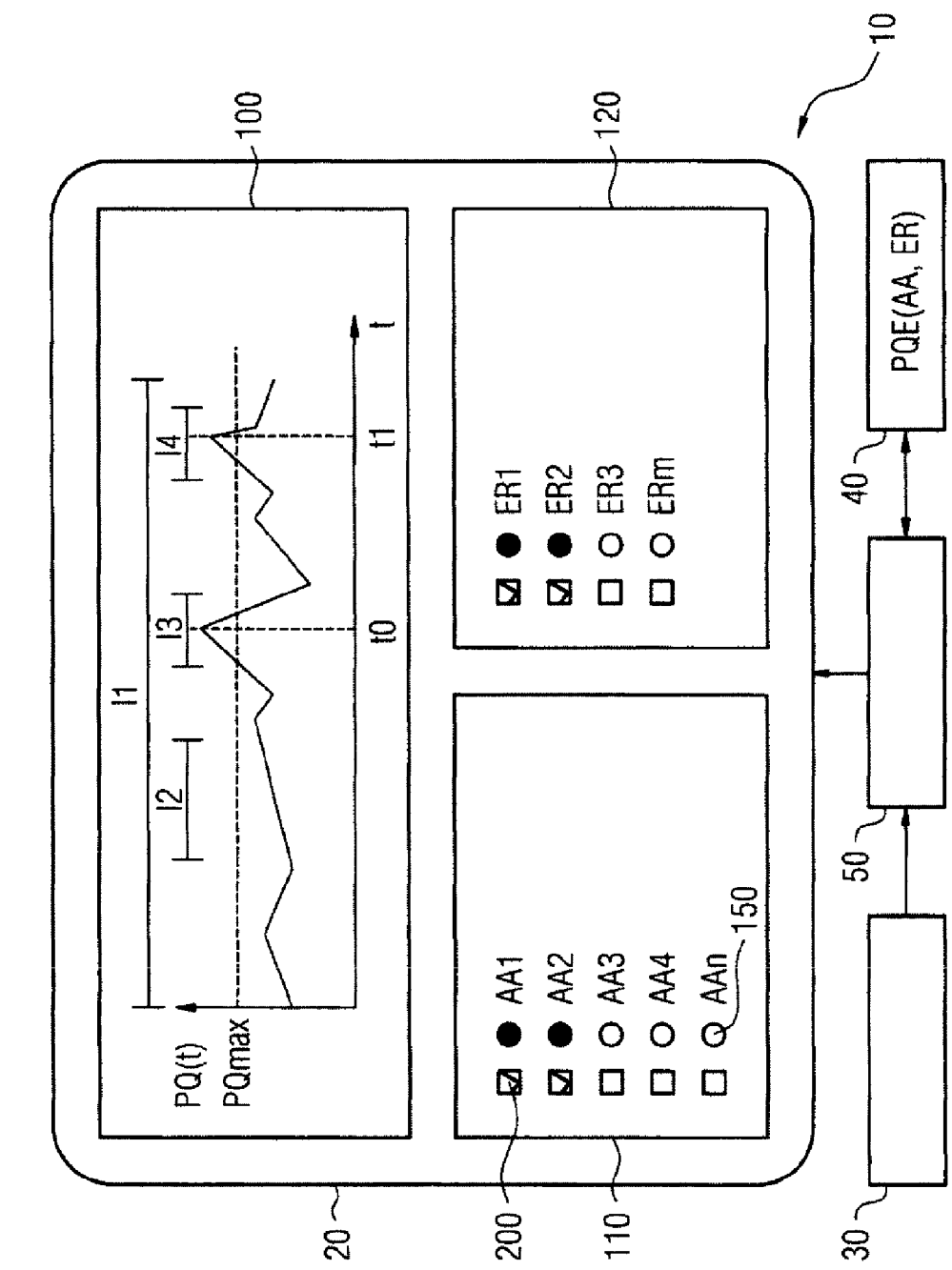
FIG. 1 shows a first exemplary embodiment of a display device according to the invention, on the basis of which the method according to the invention will also be explained, by way of example.

FIG. 1 shows a display device 10 which has a screen 20, an input device 30, a memory 40 and a control device 50. The input device 30 and the memory 40 are connected to the control device 50, which controls the screen 20.

The control device 50 controls the screen 20 such that the latter displays at least three display areas 100, 110 and 120, in order to visually display the quality of power which is transmitted in a power transmission installation, which is not illustrated in any more detail.

The display area 100 is a time-related display area which allows a user selection of a time interval which is intended to be investigated for a rule infringement of one or more predetermined power quality rules relating to one or more position-related installation sections of the power transmission installation. As can be seen, in the time-related display area 100, the display of a power quality value PQ is plotted over the time axis, that is to say over the time t. As can be seen, when the power quality value PQ is in the state illustrated by way of example in FIG. 1, a predetermined maximum value PQmax is exceeded approximately at the times t0 and t1.

In the position-related display areas 110, one or more predetermined installation sections AA1, AA2, AA3, AA4 and AAn of the power transmission installation is or are displayed for which a rule infringement investigation is intended to be carried out with respect to the predetermined power quality rules.

The display area 120 is a rule-related display area which indicates the predetermined power quality rules ER1, ER2, ER3 and ERm for which the rule infringement investigation is intended to be carried out.

The display device 10 can now be used by the user, on the basis of appropriate programming of the control device 50, which will be described in more detail in the following text, as follows:

In a first control variant, the user has the capability to vary the time window displayed in the time-related display area 100, and, for example, to display other time intervals 12, 13 or 14 instead of the time interval I1. By way of example, the desired time interval can be selected in this way by means of a keyboard or a PC mouse, which may form components of the input device 30.

The control device 50 is now designed such that, after a user selection of the time interval—for example of the time interval I1—the installation sections in which a rule infringement has occurred, and which power quality rules have been infringed, are determined. For example, if the user specifies the time interval I1, the time profile of the power quality value PQ in the time-related display area 100 on the screen 20 shows that two control infringements have occurred at the times t0 and t1.

The control infringements are also displayed in the position-related display area 110 and the rule-related display area 120: it is therefore possible to see that the control device 50 visually marks those installation sections which are affected by control infringements in the position-related display area 110, for example by means of binary-logic display elements 150, for example by a 0 or a 1, by black or white circles (as illustrated in FIG. 1) or by colored symbols, for example traffic-light symbols. As can be seen in FIG. 1, the two installation sections AA1 and AA2 are marked by black circles, since they are affected by a rule infringement.

In a corresponding manner, the control device 50 controls the screen 20 such that the power quality rules affected by the rule infringement are also correspondingly marked. The exemplary embodiment shown in FIG. 1 is based on the assumption that the two rule infringements at the times t0 and t1 related to the two power quality rules ER1 and ER2, which are correspondingly marked with black circles.

In the illustration shown in FIG. 1, the user can now not yet tell which of the two installation sections AA1 or AA2 is responsible for the rule infringement at the time t0, and which of the two installation sections AA1 or AA2 is responsible for the rule infringement at the time t1. In addition, he cannot tell which of the two power quality rules ER1 or ER2 has been infringed at the time t0, and which at the time t1.

In order to allow more detailed fault analysis to be carried out, the user of the display device 10 now has the capability to select one or more installation sections as well as one or more power quality rules with the aid of selection elements 200, which are illustrated by way of example by hooks in FIG. 1, in order to select these for the time-related display area 100 and for further analysis.

Figure 2:
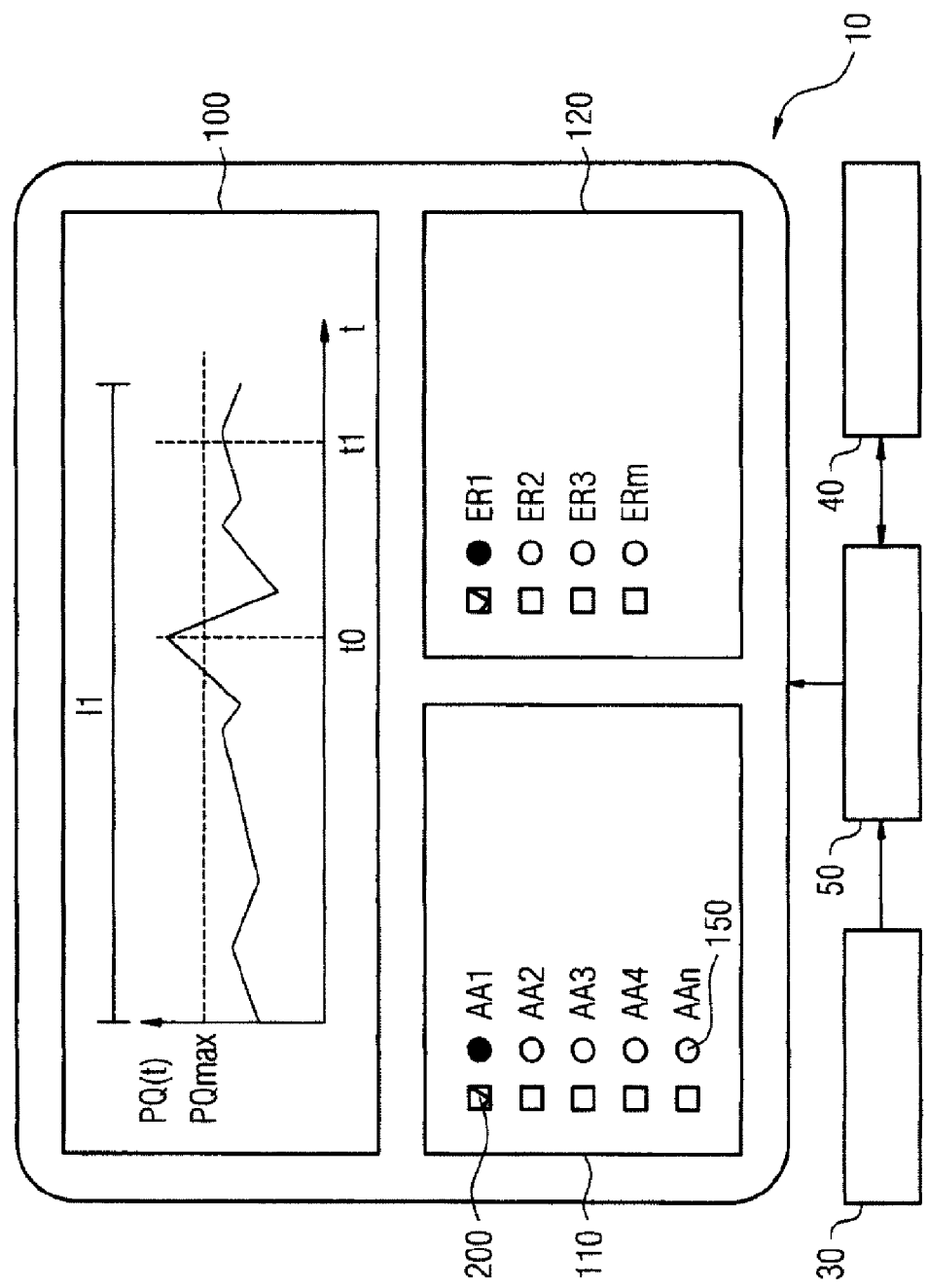
FIGS. 2 to 6 show various displays on a screen of the display device as shown in FIG. 1 during operation.

By way of example, FIG. 2 is based on the assumption that the user has subsequently used the selection element 200 in the position-related display area 110 to select the installation section AA1, for example by removing, for example clicking away, the selection elements 200 for the installation section AA2 in the display shown in FIG. 1. The control device 50 will now accordingly determine the power quality value PQ only for the installation section AA1, and will display this in the time-related display area 100.

As can be seen from FIG. 2, the power quality value PQ exceeds the predetermined limit value PQmax only at the time t0, and not, in contrast, at the time t1. The user is therefore provided with the information that the rule infringement at the time t0 was caused by the installation section AA1 and accordingly that the fault at the time t1, as illustrated in FIG. 1, must conversely be due to the installation section AA2. Furthermore, the control device 50 indicates in the rule-related display area 120 that the quality rule ER1 and not the quality rule ER2 has been infringed.

Figure 3:
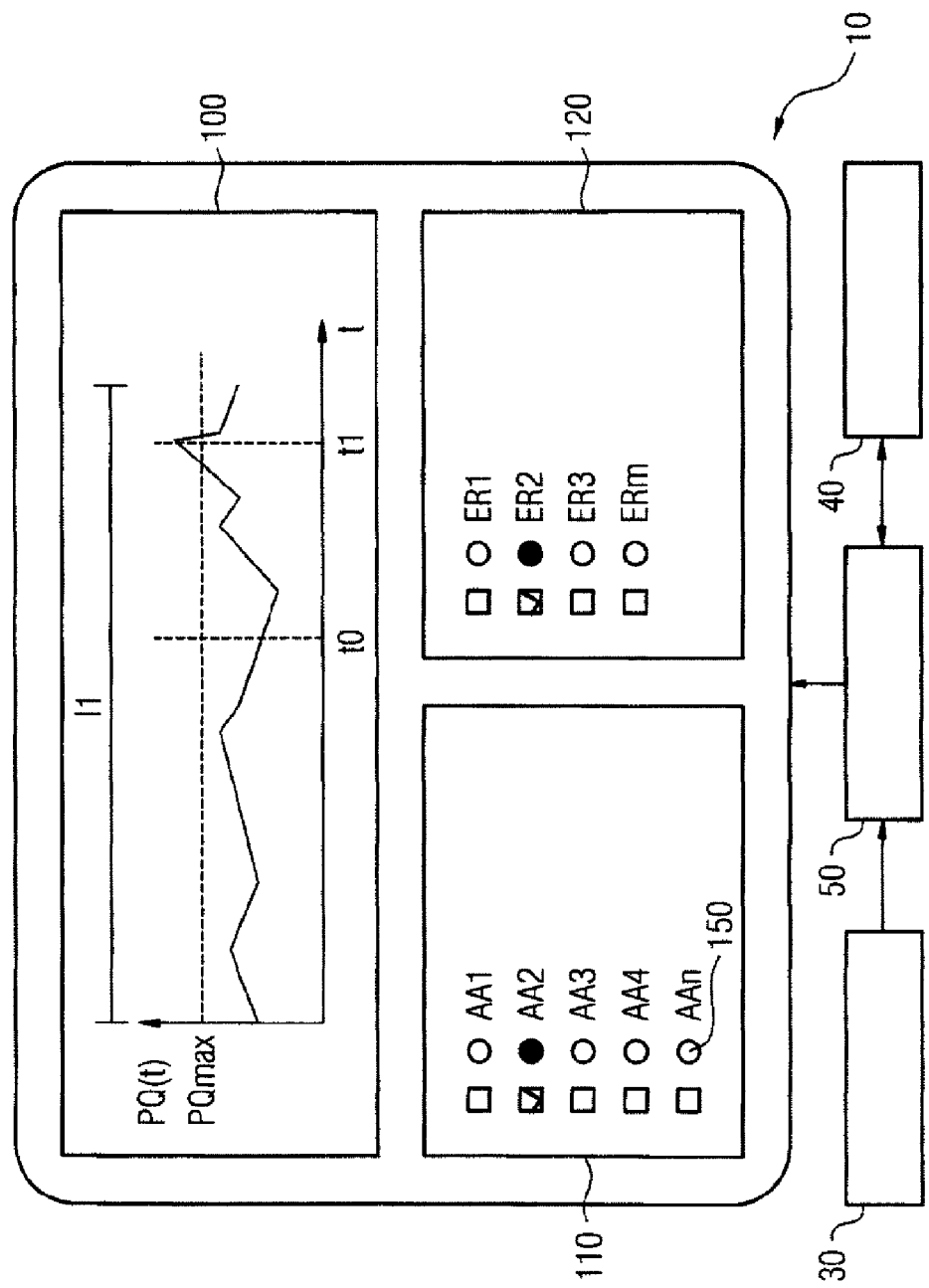

In order to verify the last-mentioned statement, the user can also select the installation section AA2 instead of the installation section AA1, thus resulting in the profile illustrated in FIG. 3 of the power quality value PQ in the time-related display area 100. The display in the rule-related display area 120 is also changed as a result of the selection of the installation section AA2: in the case of the user selection of the installation section AA2 as shown in FIG. 3, the control device 50 marks only the power quality rule ER2, since this had been infringed at the time t1 in the installation section AA2. In contrast, the power quality rule ER1 is not marked.

Therefore, in summary, when a user selects one or more installation sections in the position-related display area 110, the control device 50 always automatically ensures that this leads to an appropriate installation-related display of the power quality value PQ in the time-related display area 100, and to an appropriate installation-related display of the power quality rules affected by an infringement in the rule-related display area 120.

Instead of a position-related selection, the user of the display device 10 can also make a rule-related selection, for example by selecting one of the infringed power quality rules ER1 or ER2, starting from the state shown in FIG. 1, in order to obtain information about the time at which the respective power quality rule was infringed, and which installation section was responsible for this. Once again, this selection is made by attaching (for example clicking on) or removing (for example clicking away) the appropriate selection elements 200.

For example, if it is assumed that the user selects the power quality rule ER1 using the selection element 200, then the control device 50 appropriately updates the time-related display area with the profile of the power quality value PQ, and also appropriately updates the position-related display area 110. The resultant image on the screen 20 would correspond to the image shown in FIG. 2. As can be seen, the installation section AA1 is visually marked when the power quality rule ER1 is selected and, in the time-related display area 100, the profile of the power quality value PQ relates solely to the power quality rule ER1. As can be seen in this case as well, the power quality rule ER1 in the installation section AA1 was infringed at the time to.

If the user of the display device 10, in contrast, uses the input device 30 to select the power quality rule ER2 by means of the selection element 200, then this once again results in the image shown in FIG. 3, because the control device 50 will determine that the power quality rule ER2 was infringed in the installation section AA2 at the time t1, and will appropriately mark the installation section AA2, and carry out an update in the time-related display area 100. In order in this case to also signal that the power quality value PQ displayed in the time-related display area 100 relates to the installation section AA2, this is automatically identified by a further selection element 200, which is automatically determined and displayed by the control device 50 as soon as the user has selected the power quality rule ER2.

The user also has the capability to vary the time intervals displayed in the time-related display area 100 in order, for example, to display other time intervals, such as the time intervals 12, 13 or 14, instead of the time interval I1 as shown in FIG. 1. When the displayed time intervals in the time-related display area 100 are changed, the position-related display area 110 and the rule-related display area 120 are also updated.

Figure 4:
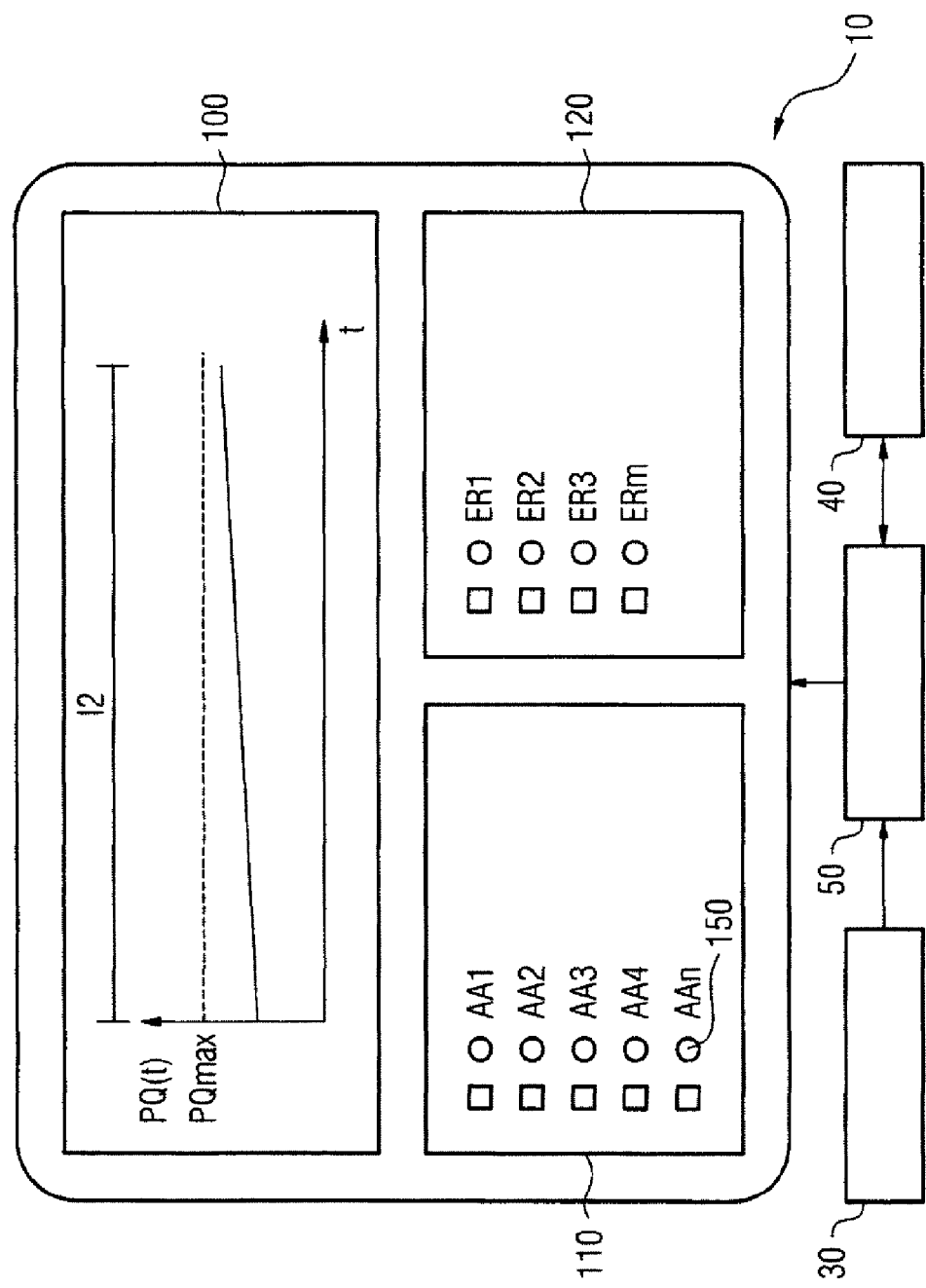

By way of example, if the user selects the time interval 12 as shown in FIG. 4, then neither an installation section nor a power quality rule is marked in the position-related display area 110 and in the rule-related display area 120, since no power quality rule has been infringed in any of the installation sections (cf. FIG. 4).

Figure 5:
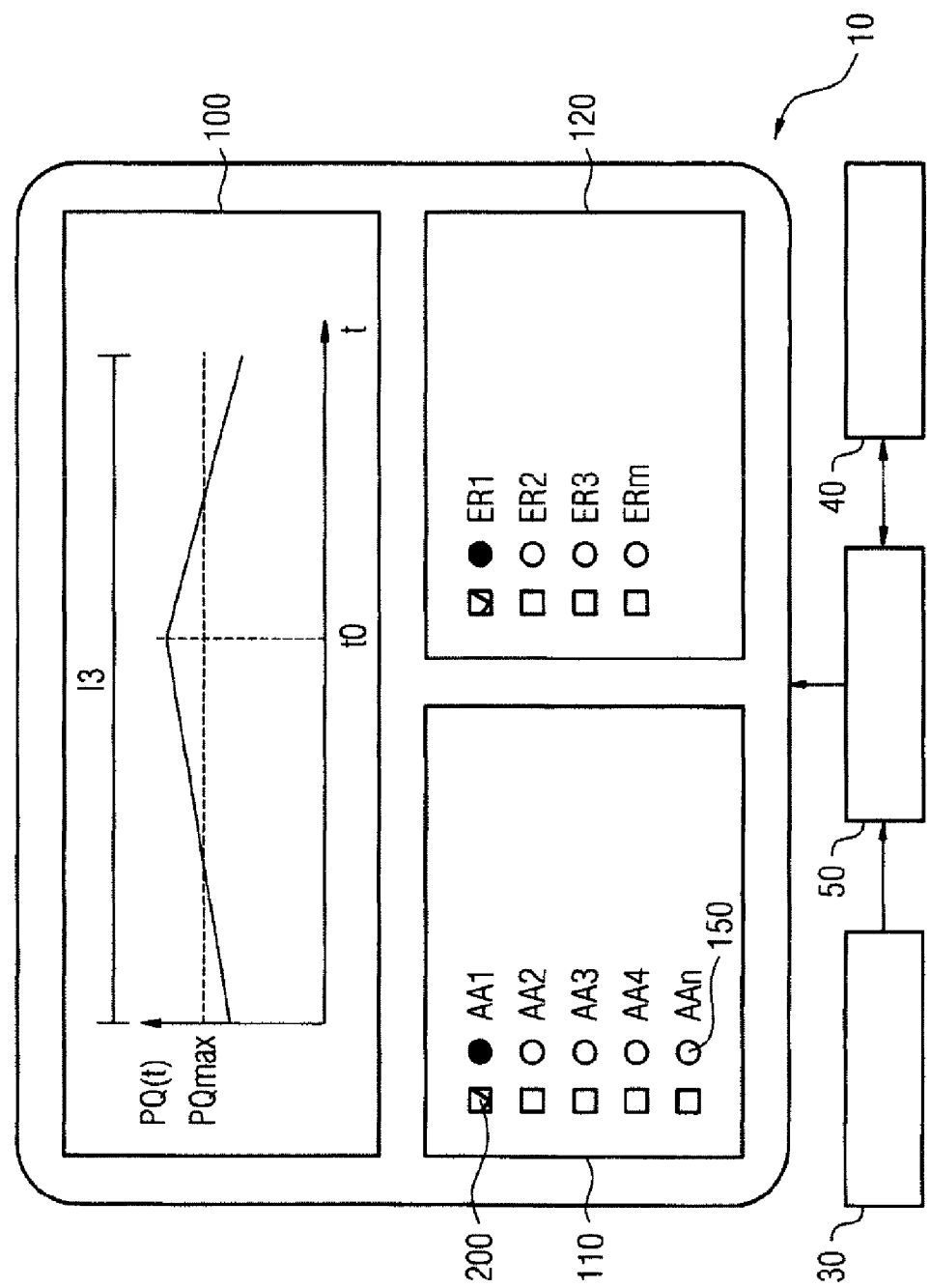

If, in contrast, the user selects the time interval 13 (cf. FIG. 5), which relates to the time to, then the installation section AA1 and the power quality rule ER1 are visually marked by the control device 50, specifically because the power quality rule ER1 has been infringed in the installation section AA1 in this time interval.

Figure 6:
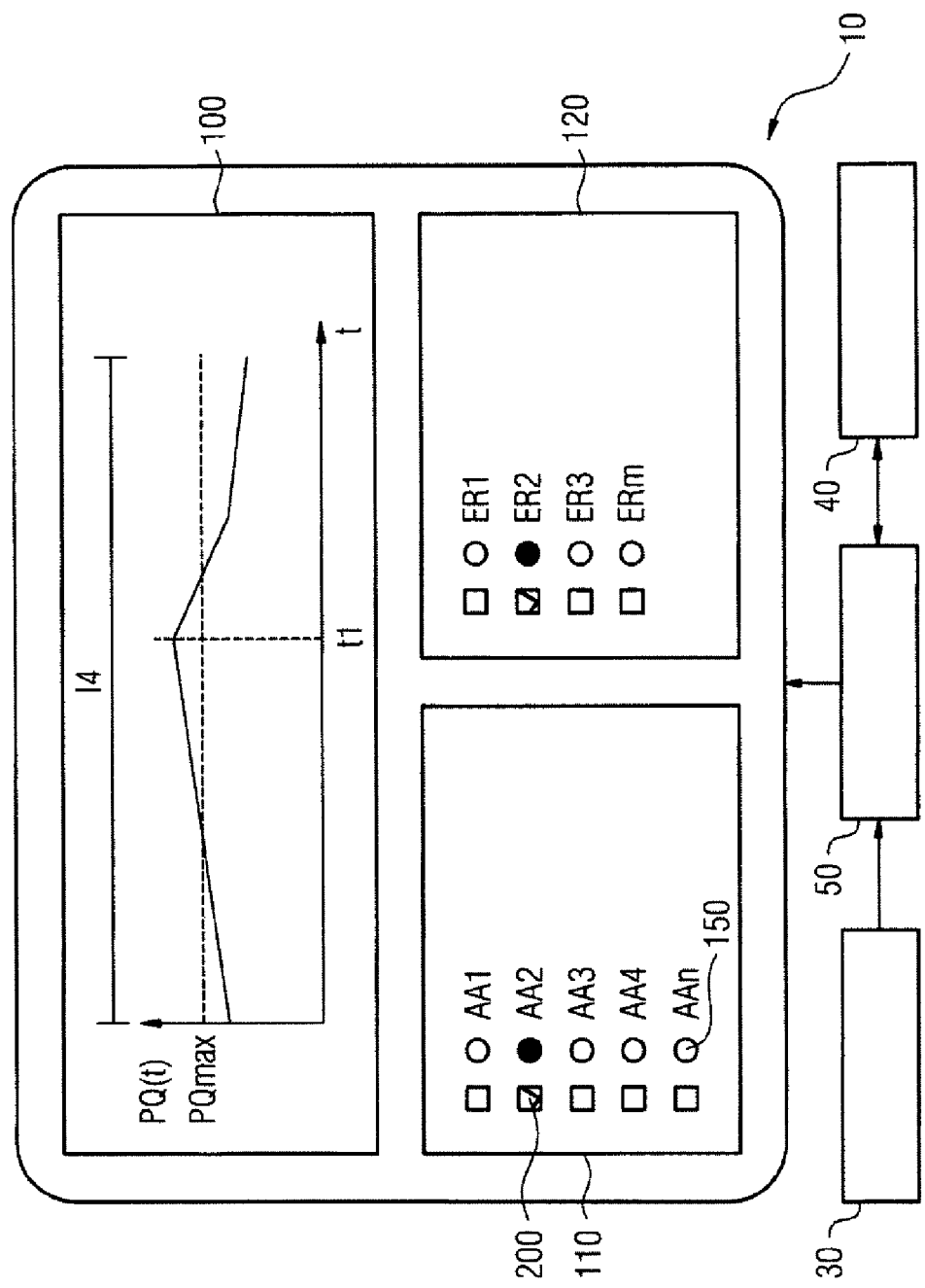

In a corresponding manner, the installation section AA2 and the power quality rule ER2 are visually marked by the control device 50 in the position-related display area 110 and in the rule-related display area 120 when the user selects the time interval 14 (cf. FIG. 6).

The power quality value PQ is therefore calculated as a function of which installation sections and which power quality rules are intended to be considered. In order to make it possible to calculate the power quality value, the respective time profile of the rule-specific and section-specific power quality value PQE(AA, ER) can be stored in the memory 40, for example for each predetermined power quality rule ER1, ER2, ER3 and ERm and for each installation section AA1, AA2, AA3, AA4 and AAn.

By way of example, in order to calculate the power quality value PQ displayed in the time-related display area 100, the control device 50 will first of all determine which power quality rules and which installation sections are to be considered, and will in each case determine the rule-specific and section-specific power quality values PQE(AA, ER) for each time to be displayed of the installation sections to be considered and of the power quality rules to be considered, and will in each case display the greatest rule-specific and section-specific power quality value PQE(AA, ER) as the resultant power quality value PQ. Therefore:

$$PQ(t)=\text{Max}[PQE(AA,ER)](t)$$

Figure 7:
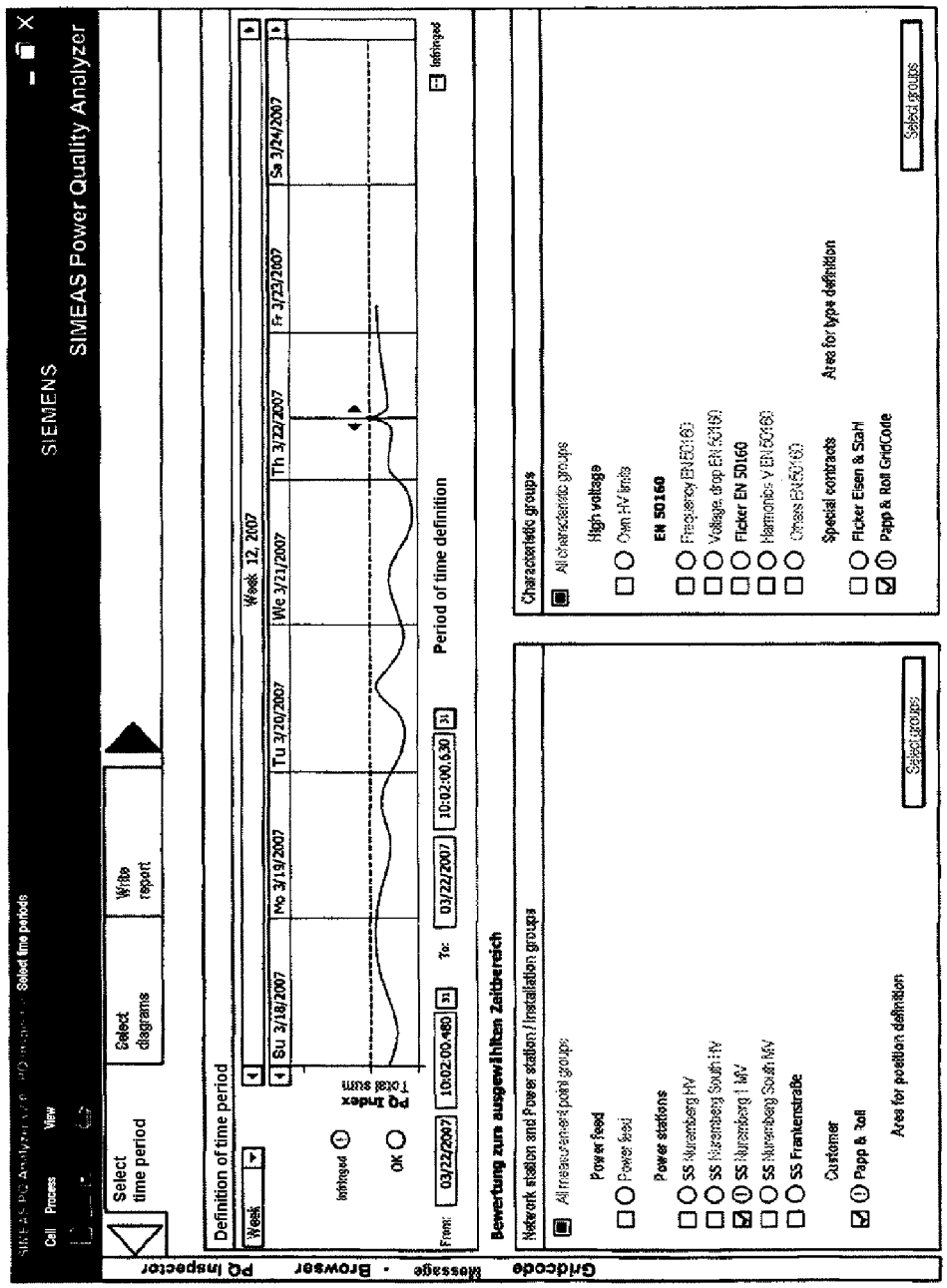
FIG. 7 shows a further exemplary embodiment of a display on a different display device according to the invention.

FIG. 7 shows a further exemplary embodiment of a display on the screen 20 based on FIG. 1.

The invention claimed is:

1. In a power transmission installation, a method for the visual display of the quality of power transmitted in the power transmission installation, the method which comprises:

displaying on a display device information in at least three display areas, the display areas including a time-related display area, a position-related display area, and a rule-related display area;

enabling a user to select, in the time-related display area, a time interval to be subjected to a rule infringement investigation with regard to one or more predetermined power quality rules;

displaying in the position-related display area one or more predetermined installation sections to be subjected to the rule infringement investigation;

displaying in the rule-related display area the predetermined power quality rules for which the rule infringement investigation is being carried out; and following a user selection of the time interval, determining the installation sections in which a rule infringement has occurred during the selected time interval, and determining which power quality rules have been infringed, and visually marking the respective installation sections and power quality rules affected by a rule infringement in the position-related display area and in the rule-related display area.

2. The method according to claim 1, which comprises:
after displaying the installation sections in which a rule infringement has occurred in the selected time interval, and which power quality rules have been infringed,
enabling a user selection for selecting one or more of the power quality rules affected by a rule infringement; and
after a user selection, determining the installation sections affected by a rule infringement with respect to the selected power quality rules.

3. The method according to claim 1, which comprises:
after displaying the installation sections in which a rule infringement has occurred in the selected time interval, and which power quality rules have been infringed,
enabling a user selection for selecting one or more of the installation sections affected by a rule infringement; and
after a user selection, determining the power quality rules which have been affected by a rule infringement with respect to the selected installation sections.

4. The method according to claim 1, which comprises:
after displaying the installation sections in which a rule infringement has occurred in the selected time interval, and which power quality rules have been infringed,
enabling a user selection for selecting one or more of the installation sections affected by a rule infringement and one or more of the power quality rules affected by a rule infringement; and
after a user selection, determining the selected power quality rules that have been affected by a rule infringement with respect to the selected installation sections.

5. The method according to claim 1, displaying a time profile of a power quality value that represents a measure of the power quality at the respective time within the time interval in the time-related display area for the respective user-selected time interval.

6. The method according to claim 5, which comprises taking into account all predetermined installation sections and all predetermined power quality rules for determining the power quality value.

7. The method according to claim 5, which comprises taking into account only those installation sections and power quality rules which are affected by a rule infringement within the user-selected time interval for determining the power quality value.

8. The method according to claim 7, which comprises taking into account all the installation sections and all the selected power quality rules for determining the power quality value when no rule infringement is found within the time interval.

9. The method according to claim 1, which comprises:
when a user selection is made of one or more power quality rules for determining and displaying the power quality value in the time-related display area, taking into account only those selected power quality rules and those installation sections that have been affected by a rule infringement within the time interval and with respect to the selected power quality rules.

10. The method according to claim 1, which comprises, upon a user selection of one or more installation sections for determining and displaying the power quality value in the time-related display area, taking into account only the selected installation sections and those power quality rules which have been affected by a rule infringement within the time interval and within the selected installation sections.

11. The method according to claim 1, which comprises visually marking in traffic light form, with red and green traffic light symbols.

12. A display device, comprising:
a screen for visually displaying a quality of power transmitted in a power transmission installation;
a control device connected to said screen and configured to carry out the method according to claim 1;
an input device connected to said control device, said input device enabling a user input of a time interval and a user selection of one or more power quality rules and/or a user selection of one or more installation sections.

13. The display device according to claim 12, which further comprises a memory connected to said control device, said memory storing a time profile of the rule-specific and section-specific power quality value for each predetermined power quality rule and for each installation section.

14. A non-transitory computer readable medium comprising a computer program which, after installation on a data processing installation, programs the data processing installation to carry out the method according to claim 1.

* * * * *